United States Patent [19]

Flowers

[11] 4,419,032
[45] Dec. 6, 1983

[54] BORING TOOL

[76] Inventor: Thomas Flowers, 1069 E. York, Flint, Mich. 48505

[21] Appl. No.: 231,469

[22] Filed: Feb. 4, 1981

[51] Int. Cl.³ .............................................. B23B 45/14
[52] U.S. Cl. .................................. 408/112; 408/114; 408/141; 408/712
[58] Field of Search ............... 408/136, 114, 141, 712, 408/108, 109, 110, 111, 112, 127; 409/144; 144/104, 106; 145/116 R

[56] References Cited

U.S. PATENT DOCUMENTS

| | | | |
|---|---|---|---|
| 836,212 | 11/1906 | Pierce et al. | 408/114 |
| 924,473 | 6/1909 | Kindleberger et al. | 408/111 |
| 1,114,373 | 10/1914 | Lane | 408/110 |
| 1,517,987 | 12/1924 | Henderson | 408/114 |
| 2,617,455 | 11/1952 | Kuta | 408/712 X |
| 3,006,223 | 10/1961 | Broussard | 408/110 X |
| 3,032,156 | 5/1962 | Eriksson | 408/141 X |
| 4,021,133 | 5/1977 | Ebert | 408/141 |
| 4,184,795 | 1/1980 | Medlin | 408/127 |

FOREIGN PATENT DOCUMENTS 40550 12/1924 Norway ........................ 145/116 R

*Primary Examiner*—Z. R. Bilinsky
*Attorney, Agent, or Firm*—Stephenson and Boller

[57] ABSTRACT

An improved boring tool comprising a generally elongated housing member, an angle drive mechanism providing rotation about an axis at right angles to the housing member, and a unique floating boring bit which is slidably mounted upon the angle drive mechanism for axial movement along the axis of rotation. The boring bit features a central lead screw for drawing the bit axially into and through the workpiece over which the boring bit is placed as permitted by the floating mounting. A telescoping wall structure of the boring bit permits the bit to continue extending axially to complete penetration of the workpiece. An integral power source may be provided or provision made for the attachment of a portable electric drill or other readily available external power source. The cutting head of the boring bit may be removably mounted to facilitate replacement of worn cutting surfaces and to permit substitution of boring bits of different sizes for boring holes of different diameters. The angle drive mechanism may include beveled spur gears, a worm gear, pulleys and belts, or chain and sprocket elements, and may be driven by either a flexible or rigid shaft.

4 Claims, 5 Drawing Figures

U.S. Patent  Dec. 6, 1983  4,419,032
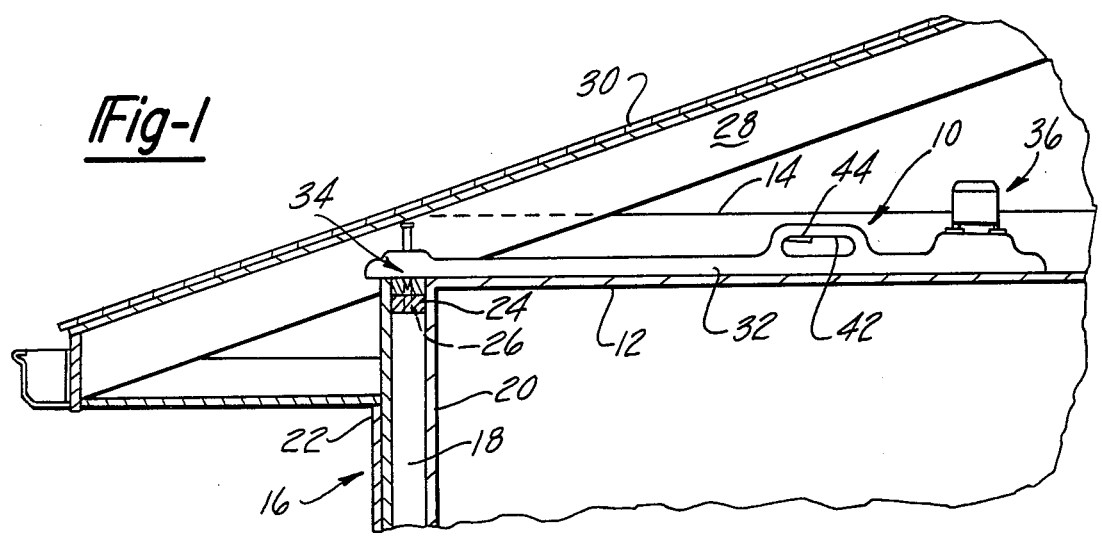
*Fig-1*
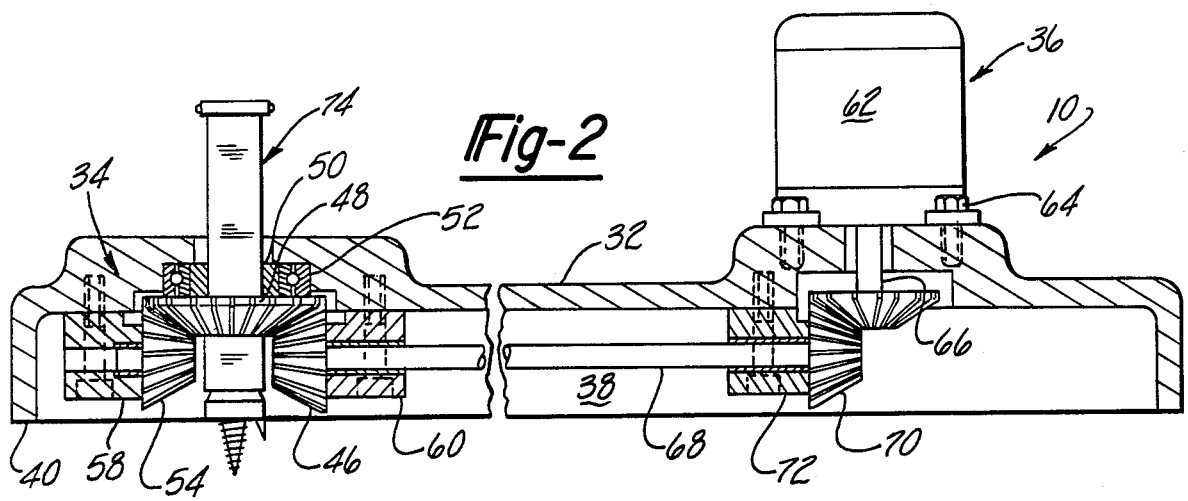
*Fig-2*
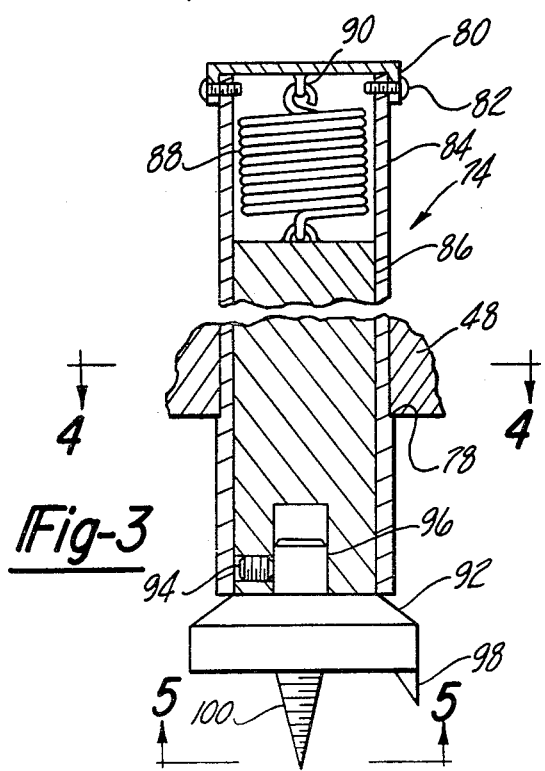
*Fig-3*
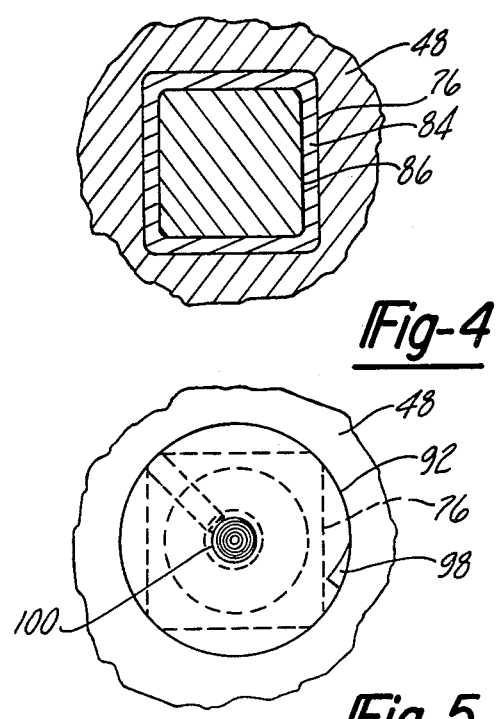
*Fig-4*
*Fig-5*

BORING TOOL

BACKGROUND OF THE INVENTION

1. Field of the Invention

The present invention relates to cutting by means of a rotating axially moving tool, and, more particularly, the invention is a boring tool especially adapted for use in a limited space such as the boring of holes in building plates from a position in the attic of a frame building.

2. Description of the Prior Art

In installing electrical conduits in buildings already constructed, it is customary to bring the conduit into the upper portion or attic of the structure by passing the conduit between the walls of the building and up through the building plates adjacent the roof structure. The space available for working in this attic area is extremely restricted due to the regularly spaced roof rafters and corresponding ceiling joists adjacent the building plates. The difficulties are particularly acute when the roof of the building has a relatively flat pitch or when the roof is supported by closely spaced prefabricated trusses, as typical of many modern building designs. Conventional general purpose drilling devices, even when equipped with flexible cable attachments, have been inconvenient and inadequate for these purposes.

Special plate boring devices have been devised by J. G. Broussard and G. D. Medlin, as disclosed in U.S. Pat. Nos. 3,006,223 and 4,184,795, issued Oct. 31, 1961, and Jan. 22, 1980, respectively. Broussard's device is merely a guide means mountable upon the building plates for receiving and guiding a conventional flexible cable fitted to an electric drill. Medlin's device is simply a rigid tubular extension and angular drive head for use with a portable electric drill. These prior art devices are best suited to non-vertical boring and are not able to penetrate thick building plates when the hollow area of the exterior wall is narrow or when the pitch of the roof is extremely flat. Further, the electric drill or other power source of the prior art devices must be manually advanced by the operator to cause the boring tool to penetrate the building plates. Alignment of these devices, particularly due to the moving nature of the power source, is inconvenient.

Accordingly, it is an object of the present invention to provide an improved boring tool which is particularly suited to drilling vertical access holes in building plates, which is convenient to align from a position distant from the building plates, which is self-feeding, and which does not require advancing of the power source.

SUMMARY OF THE INVENTION

The present invention is an improved boring tool comprising a generally elongated housing member, an angle drive mechanism to provide output rotation about an axis at right angles to the housing member, and a unique floating boring bit which is slidably mounted upon the angle drive mechanism for axial movement along the axis of rotation. The boring bit features a central lead screw for drawing the bit axially into and through the building plates or other workpiece over which the boring bit is placed as permitted by the floating mounting. A telescoping wall structure of the boring bit permits the bit to continue extending axially to complete penetration of the workpiece.

The boring tool of the present invention can be constructed with an integral power source and with various additional features disclosed herein. If an integral power source is not provided, provision is made for the attachment of a portable electric drill or other readily available external power source. The cutting head of the boring bit may be removably mounted to facilitate replacement of worn cutting surfaces and to permit substitution of boring bits of different sizes for boring holes of different diameters. The angle drive mechanism may include beveled spur gears, worm gears, pulleys and belts, or chain and sprocket elements. Either a flexible or rigid shaft may be used to connect the angle drive mechanism to the power source. The boring bit may be of square, hex, splined or other keyed configuration and can be equipped with biasing means to partially retract the bit following each use.

Although the present invention is particularly adapted to the boring of vertical access holes through building plates from the attic of a frame building, the boring tool of the present invention is also suited to the needs of many other jobbers. In places where there is inadequate space to position and operate conventional drills, hole saws, paddle cutters, or other cuting tools, the present device may be of substantial benefit. Because the boring bit is driven by a sliding engagement of the perimeter of the boring bit rather than by a fixed engagement of the end of the boring bit upon the end of its shaft, the boring bit may be made self feeding without requiring advancing of the power source. Further objects, features and advantages of the present invention will become apparent from consideration of the following description, the appended claims and the accompanying drawings.

BRIEF DESCRIPTION OF THE DRAWINGS

FIG. 1 is a sectional view of the boring tool of the present invention in operative position for boring access holes in building plates from the limited attic space of a building;

FIG. 2 is a sectional view of the boring tool;

FIG. 3 is an enlarged sectional view of the boring bit of the boring tool;

FIG. 4 is a sectional view of the boring bit taken along the line 4—4 of FIG. 3; and FIG. 5 is a bottom view of the boring bit taken along the line 5—5 of FIG. 3.

DESCRIPTION OF THE PREFERRED EMBODIMENT

With reference to the drawing, the boring tool of the present invention, indicated generally as 10, is illustrated in FIG. 1 in operative position for boring access holes in building plates from the limited attic space of a building. The boring tool 10 is positioned upon the ceiling 12 of the building comprising the attic floor and extends horizontally between the ceiling joists 14 to the building's exterior wall, indicated generally as 16. The exterior wall 16 has a free area 18 formed between an inner wall 20 and an outside sheathing 22, and is capped with a pair of building plates 24. In order to gain access to the free area 18 for the placement of insulation or electric wiring therein, an access hole 26, indicated in phantom, is bored vertically through the building plates 24. Since these building plates are adjacent the juncture of the rafters 28 and the roof 30, there is very little space directly above the desired access hole 26 for a conventional boring device or operator.

The boring tool 10 includes an elongated housing 32 which may be formed by casting or folded from sheet metal stock. The housing 32 serves as a mounting platform for an angle drive mechanism, indicated generally as 34, and a power source, indicated generally as 36. Additionally, the housing 32 includes a cavity 38 for containing various moving parts so as to protect the operator from accidental injury. The bottom edges 40 of the housing 32 serve as a base for the boring tool 10 so as to ensure proper positioning of the boring tool with respect to the building plates 24. A handle 42 and trigger switch 44 are formed on the top of the housing 32 adjacent the power source 36 for convenient operation of the boring tool by an operator remote from the building plates 24.

The angle drive mechanism 34 comprises a driving beveled spur gear 46 which rotates about an axis longitudinal of the housing 32 and a driven beveled spur gear 48 which rotates about an axis transverse of the housing 32. The driven gear 48 is mounted by means of a flange 50 seated within a ball bearing race 52 which is pressed into the housing 32 from below. An idler beveled spur gear 54, which has the same dimensions as the driving gear 46, is positioned diametrically opposite the driving gear 46 and in engagement with the driven gear 48 so as to maintain the alignment of the driven gear and reduce binding at the ball bearing race 52. The gears 46, 48 and 54 are secured within the cavity 38 from below by means of sleeved pillow blocks 58 and 60 upon which the idler gear 54 and driving spur gear 46 are journaled. The driven gear 48 is held in axial position by the opposing forces of the gears 46 and 54 and the bearing race 52. Alternative thrust bearing configurations of the bushings of the pillow blocks 58 and 60 and of the ball bearing race 52, such as needle roller bearings, may be utilized to increase the axial load bearing capability of the angle drive mechanism 34.

The power source 36 is mounted upon the housing 32 opposite the angle drive mechanism so as to be away from the limited space above the building plates 24. The power source is operably connected to the angle drive mechanism 34 and electrically actuated by the trigger switch 44. In the preferred embodiment shown, the power source 36 is a flange-mounted C-face electrical motor 62, which is mounted upon the housing 32 from above by four capscrews 64 and has its output shaft 66 aligned transversely of the housing 32. The output shaft 66 protrudes into the cavity 38 where it engages a drive shaft 68 by means of a pair of beveled spur gears 70 which are held in engaging relationship by a sleeved pillow block 72. It will be noted that the cavity 38 completely encloses the drive shaft 68 and the gears 46, 48, 54 and 70 when the housing 32 is placed upon a flat surface. Further, the configuration of the housing 32 ensures that when the boring tool 10 is positioned upon a horizontal surface, such as the floor of an attic, the driven gear 48 rotates about a vertical axis.

A uniquely configured boring bit 74 is slidably mounted within the driven gear 48 and flange 50 concentric therewith for axial movement of the boring bit 74 with respect to the driven spur gear 48. The boring bit 74 has a generally square outer surface 76 as shown in FIG. 4 and is machined to slide smoothly within a complementary square aperture in the driven gear 48 and flange 50 so as to ensure rotation of the boring bit in response to the rotation of the driven gear 48 while allowing the boring bit to float freely along its axis. A shoulder 78 is left to stand above the machined square surface 76 to stop the upward floating movement of the boring bit 74, and a cap 80 is secured by machine screws 82 to stop the downward movement of the boring bit 74. The boring bit 74 comprises a hollow outer shaft 84 and a solid inner shaft 86 which is also square in cross section and telescopes freely within the outer shaft 84. A tension spring 88 is secured to the cap 80 and the inner shaft 86 by means of hooks 90 welded to the surfaces thereof so as to bias the inside shaft 86 upward with respect to the outer shaft 84. A conventional check strap, not shown, is secured at its ends to the hooks 90 so as to stop the downward movement of the inner shaft 86.

A replaceable cutting head 92, generally of the auger type, is fixed to the lower end of the inner shaft 86 by means of a set screw 94 which extends radially from a corner of the inner shaft 86 into a flat or recess of a stem 96 of the cutting head 92. The cutting head 92 includes a spur cutter 98 along the circumference of the cutting head 92 and a helical flute, not shown, for transferring chips of cut material upward. A central lead screw 100 protrudes axially from the end of the boring bit 74. The bottom edges 40 of the housing 32 and the shoulder 78 cooperate as shown in FIG. 2 to position the spur cutter 98 and the lead screw 100 in interference relationship with a flat supporting surface when the housing 32 is positioned thereon. This inerference relationship permits the operator to initiate penetration of the workpiece by the lead screw 100 by forcing the handle 42 of the housing 32 downward against the supporting surface.

In the operation of the boring tool 10, the operator merely positions the boring tool as shown in FIG. 1 and applies a downward force upon the handle 42 while engaging the trigger switch 44. The switch 44 actuates the flange mounted motor 62 which drives through the drive shaft 68 and the gears 70, 46, 48, and 54 to rotate the boring bit 74 and cause penetration of the workpiece by the central lead screw 100. After the lead screw threadably advances into the workpiece sufficiently to gain a purchase therein, the spur cutter 98 cuts a narrow circular path marking the circumference of the desired hole.

Upon further rotation of the boring bit 74, the lead screw 100 draws the outer and inner shafts 84 and 86 downward as a unit through the flange 40 and the driven gear 48 to begin removal of material from the workpiece. A conventional radially extending cutter slices away material between the central lead screw 100 and the spur cutter 98 and passes the cut material as chips upward by means of a helical flute passing through the cutting head 92. Sufficient space is provided between the outer shaft 84 and the inside diameter of the bored hole for the removal of chips upward during the boring process. When the outer shaft 84 has been drawn downward to its lower limit as defined by the engagement of the cap 80 with the flange 50, further advancement of the cutting head 92 is provided by the telescoping of the inner shaft 86 downward with respect to the outer shaft 84. Just before the central lead screw 100 fully penetrates the workpiece, the spur cutter 98 completes cutting of the circumference of the hole, and the tension spring 88 retracts the inner shaft 86 upward into the outer shaft 84 to facilitate removal of the boring bit from the workpiece.

Applicant has found that access holes having a depth of approximately 5 inches can be easily bored through building plates by the use of a boring bit 74 having an outer shaft 84 with 3 inches of travel relative to the driven gear 48 and by the use of an inner shaft 86 having a useful telescoping extension of 2 inches relative to the outer shaft 84. Further, although the preferred embodiment includes beveled spur gears and an integral electric motor mounted so as to be transverse of the housing 32, applicant has determined that alternative transmission means such as a chain and sprocket, worm and worm gear, or V-belt and pulley may also be used. And, the power source may be mounted longitudinally as well as transversely and may be connected to the angle drive mechanism 34 by means of a flexible shaft or V-belt instead of the rigid drive shaft 68 of the preferred embodiment. Alternatively, the boring tool may include a connection for a readily available external power source such as a portable electric drill.

The boring bit 74 may, of course, have cross-sectional configurations different from those of the preferred embodiment. The slidable mounting of the outer shaft 84 within the driven gear 48 and the flange 50 may be provided by a splined, hex, or other keyed configuration of the outer shaft 84 and of the surface upon which it slides. Similarly, the telescoping of the inner shaft 86 within the outer shaft 84 may be provided by a splined, hex, or other keyed configuration of the mating surfaces of those shafts. Although not essential to the basic operation of the boring tool of the present invention, applicant notes that the sliding of the boring bit 74 within the driven gear 48 and flange 50 and the telescoping of the inner shaft 86 within the outer shaft 84 may be enhanced by the addition of appropriate lubricants and by the selection of complementary materials for the adjacent elements.

It will be seen from the foregoing description of the preferred embodiment that the present invention provides a boring tool which is particularly suited to the boring of access holes in building plates from the restricted space of an attic of a frame building. The boring tool is self feeding and does not require the advancing of a power source to cause penetration of the building plates. Further, the boring tool is convenient to use and has applications beyond that of the boring of access holes through building plates. While the preferred embodiment has been described in considerable detail, the present invention is not to be limited to such detail, except as may be necessitated by the appended claims.

What is claimed is:

1. A boring tool adapted for operation in a limited workspace for boring holes through a workpiece against which the tool is placed, said boring tool comprising:

a elongated rigid housing, angle drive means mounted adjacent a first end of said housing to deliver rotation about an axis transverse to the length of said housing, a boring bit slidably and drivably mounted on said angle drive means so as to permit axial movement of said boring bit while being rotated about said transverse axis, and transmission means mounted on said housing for transmitting rotation from a power source adjacent the second end of said housing to said angle drive means, said boring bit comprising a shaft via which the boring bit is coupled with said angle drive means, a second shaft telescopically engaged and keyed with said first shaft so as to be axially shiftable relative to the first shaft while being rotatably coupled with the first shaft, a cutting head mounted on the second shaft at the axial end thereof nearer the workpiece, resiliently yieldable means operatively disposed between the two shafts for biasing the second shaft axially relative to the first shaft away from the workpiece but resiliently yielding during certain boring operations so as to allow the second shaft to advance axially toward the workpiece relative to the first shaft, said first shaft having an axial lost motion connection with said angle drive means limited by stops, said cutting head comprising a screw thread for engaging the workpiece to advance the cutting head into the workpiece upon rotation of said boring bit by said angle drive means so as to bore a hole into the workpiece, said axial lost motion connection providing axial advancement of said first and second shafts in unison during boring operations until said resiliently yieldable means begins to yield.

2. A boring tool as set forth in claim 1, in which the second shaft telescopes within the first shaft.

3. A boring tool as set forth in claim 2, in which the boring bit is so constructed and arranged that the resiliently yieldable means biases the second shaft to a condition in which the second shaft is fully telescoped within the first shaft.

4. A boring tool as set forth in claim 2, wherein said stops are provided by a shoulder on the outside of said first shaft and a cap on the one axial end of the first shaft which is farther from the cutting head and but for the cap would be open, said resiliently yieldable means comprising a coil spring disposed within the first shaft and extending between said cap and said second shaft.

* * * * *